United States Patent [19]
Kautz et al.

[11] Patent Number: 5,636,328
[45] Date of Patent: Jun. 3, 1997

[54] METHODS AND APPARATUS FOR CONSTRAINT SATISFACTION

[75] Inventors: Henry A. Kautz; Bart Selman, both of Summit, N.J.

[73] Assignee: Lucent Technologies Inc., Murray Hill, N.J.

[21] Appl. No.: 664,299

[22] Filed: Feb. 22, 1996

Related U.S. Application Data

[63] Continuation of Ser. No. 34,335, Mar. 22, 1993, abandoned.

[51] Int. Cl.$^6$ .............................. G06F 9/44; G06F 15/18
[52] U.S. Cl. ............................................................ 395/50
[58] Field of Search ................................... 395/50, 81, 51

[56] References Cited

U.S. PATENT DOCUMENTS

| | | | |
|---|---|---|---|
| 4,835,690 | 5/1989 | Gangarosa et al. | 395/11 |
| 5,228,115 | 7/1993 | Natarojan | 395/51 |
| 5,249,261 | 9/1993 | Natarajan | 395/51 |
| 5,267,346 | 11/1993 | Maruyama | 395/51 |

OTHER PUBLICATIONS

D.S. Johnson, C. H. Papdimmitrou, and M. Yannakakis, "How Easy is Local Search", *Journal of Computer and System Sciences*, vol. 37, pp. 79–100, 1988.

B. Selman, H. Levesque, and D. Mitchell, "A New Method for Solving Hard Satisfiability Problems", *Proceedings of the Tenth National Conference on Artificial Intelligence*, pp. 440–446, 1992.

J. Gu, "Efficient Local Search for Very Large–Scale Satisfiability Problems", *Sigart Bulletin*, vol. 3, No. 1, pp. 8–12, 1992.

S. Kirkpatrick, C. D. Gellett, and M. P. Vechi, "Optimization by Simulated Annealing", *Science*, vol. 220, pp. 621–630, 1983.

P. Morris, "The Breakout Method for Escaping From Local Minima", AAAI–93 & IAAI–93, *Proceedings of the Eleventh National Conference on Artificial Intelligence*, Washington, D.C., Jul. 1993.

B. Selman, H. Kautz, "An Empirical Study of Greedy Local Search of Satisfiability Testing", AAAI–93 & IAAI–93, *Proceedings of the Eleventh National Conference on Artificial Intelligence*, Washington, D.C., Jul. 1993.

C. J. Wang, E. P. K. Tsang, "Solving Constraint Satisfaction Problems Using Neural Networks", *Second International Conference on Artificial Neural Networks*, Nov. 18–20, 1991.

S. Selman, H. Levesque, D. Mitchell, "A New Method for Solving Hard Satisfiability Problems", AAAI–92, *Proceedings Tenth National Conference on Artificial Intelligence*, Jul. 12–16, 1992.

Maruyama et al, "Solving Combinatorial Constraint Satisfaction and Optimization Problems using Sufficient Conditions for Constraint Violation", Proc Int'l Symposium on AI, Nov. 13–15 1991, pp. 269–275.

Smith et al, "Combining Constraint Satisfaction and Local Improvement Algorithm to Construct Anaesthetists Rates" Proc 8th Conf on AI for Applications, Mar. 2–6, 1992, pp.106–112.

(List continued on next page.)

*Primary Examiner*—Robert W. Downs
*Attorney, Agent, or Firm*—Gordon E. Nelson

[57] ABSTRACT

A technique for finding values which satisfy a set of constraints. The technique is used with local search procedures for finding such values and overcomes the tendency of such local search procedures to "get stuck" at local minima. The technique dynamically adds weight to constraints in the set which are not satisfied by the current set of values and uses the weights of the constraints to determine the next set of values to be used in the local search. In the disclosed embodiment, the technique is used in the GSAT greedy local search procedure. Also disclosed is a system for controlling a robot arm which uses the technique.

12 Claims, 3 Drawing Sheets

OTHER PUBLICATIONS

Wang et al, "Solving Constraint Satisfaction Problems Using Neural Networks" and Int'l Conf on Neural Networks, Nov. 18–20, 1991.

Miltal et al, "Dynamic Constraint Satisfaction Problems", Proc 8th Nat'l Conference on AI, vol. 1 pp. 25–32, Jul. 29–Aug. 3 1990.

Minton et al, "Solving Large Scale Constraint Satisfaction and Scheduling Problems Using a Heuristic Repair Method", Proc 8th Nat'l Conf on AI, vol. 1, pp. 17–24, Jul. 29–Aug. 3, 1990.

Selman et al, "A New Method for Solving Hard Satisfiability Problems", Proc 10th Nat'l Confon AI pp. 440–446, 1992.

FIG. 1
(PRIOR ART)

```
                                                                    101
PROCEDURE GSAT
INPUT:   A SET OF CLAUSES α, MAX-FLIPS, AND MAX-TRIES
OUTPUT:  A SATISFYING TRUTH ASSIGNMENT OF α, IF FOUND
BEGIN                          109
     FOR i: = 1 TO MAX-TRIES
          T: = A RANDOMLY GENERATED TRUTH ASSIGNMENT — 103
          FOR j: = 1 TO MAX-FLIPS — 111
               IF T SATISFIES α THEN RETURN T — 112
               ⎡ p: = A PROPOSITIONAL VARIABLE SUCH THAT A CHANGE
               ⎢      IN ITS TRUTH ASSIGNMENT GIVES THE LARGEST INCREASE
          108 ⎨      IN THE TOTAL NUMBER OF CLAUSES OF α THAT ARE    105  107
               ⎣      SATISFIED BY T
          110 — T: = T WITH THE TRUTH ASSIGNMENT OF p REVERSED
          END FOR
     END FOR
     RETURN "NO SATISFYING ASSIGNMENT FOUND"
END
```

FIG. 2

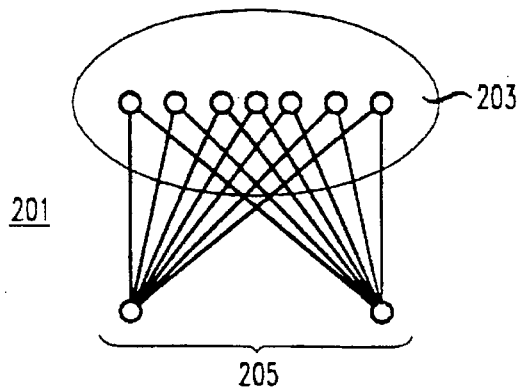

FIG. 4

1. INITIALIZE THE WEIGHTS FOR THE CLAUSE TO 1   — 403
2. AT THE END OF EACH TRY, INCREMENT BY 1 THE WEIGHTS OF THOSE
   CLAUSES, NOT SATISFIED BY THE CURRENT ASSIGNMENT
                                                          — 405
401

FIG. 3

```
LET NVARS = NUMBER OF VARIABLES
LET SCORE [NVARS] = AN ARRAY OF LENGTH NVARS
LET ASSIGN [VARS] = AN ARRAY OF LENGTH NVARS CONTAINING THE
        CURRENT TRUTH ASSIGNMENT FOR EACH VARIABLE                          } 303
LET CLAUSE [NCLAUSES] = AN ARRAY OF LENGTH NCLAUSES, WHERE
        EACH ENTRY IS A CLAUSE
LET WEIGHT [NCLAUSES] = AN ARRAY OF LENGTH NCLAUSES, WHERE
        EACH ENTRY IS A CLAUSE'S CURRENT WEIGHT
FOR i=1 TO NVARS DO:
        SCORE[i] = 0
        FLIP THE VALUE OF ASSIGN [i];  /—307                                   301
        FOR j = 1 TO NCLAUSES DO:
305 {       309 {  IF (CLAUSE [j] IS SATISFIED BY ASSIGN) THEN  } 308
                        SCORE [i] = SCORE [i] + WEIGHTS [j];
        END FOR;
        FLIP THE VALUE OF ASSIGN [i] (BACK);  /—311
END FOR;
PICK i SUCH THAT SCORE [i] IS MAXIMUM  /—313
```

FIG. 5

| # UNSAT CLAUSES AT END OF TRY | # OF TIMES REACHED | |
|---|---|---|
| | BASIC | WEIGHTS |
| 0 | 0 | 80 |
| 1 | 2 | 213 |
| 2-4 | 0 | 0 |
| 5-9 | 90 | 301 |
| 10+ | 908 | 406 |

FIG. 6

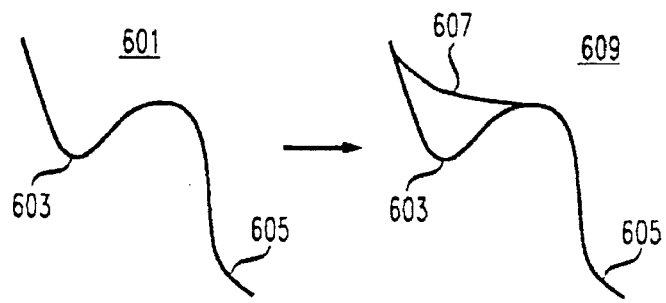

METHODS AND APPARATUS FOR CONSTRAINT SATISFACTION

This application is a continuation of application Ser. No. 08/034,335, filed on Mar. 22, 1993 now abandoned.

BACKGROUND OF THE INVENTION

1. Field of the Invention

The invention has generally to do with finding values of parameters of a system which satisfy a set of constraints and specifically to do with techniques for finding such values which do not "get stuck" at local minima.

2. Description of the Prior Art

Many problems in artificial intelligence, computer science, manufacturing, business, and other fields can be posed as constraint satisfaction problems. A constraint satisfaction problem consists of a set of variables, a set of possible values for each variables, and a set of constraints between subsets of the variables. Each constraint on a subset of the variables restricts the possible values that may be simultaneously assigned to those variables. A solution to a constraint satisfaction problem is an assignment of values to each variable such that all constraints are satisfied.

An important class of constraint satisfaction problems are conjunctive normal form Boolean constraint satisfaction problems. (This class is commonly named "CNF".) In such problems, each variable has to be assigned one of just two possible values: true or false. A literal is defined as either a variable or the negation of a variable. Each constraint is then given by a clause in propositional logic, which is a disjunction of literals.

For example, let the variables be A, B, and C. Let there be three constraints, where the first is "A or C"; the second is "(not A) or C"; and the third is "B or (not C)". The first constraints specifies that either A is set to true, or B is set to true; or both are set to true. (Henceforth, "or" will always be meant in this inclusive sense, unless specified otherwise.) This eliminates the possibility of setting both A and C to false simultaneously. The second constraint specifies that either A is set to false (which is indicated by the "not"), or C is set to true. Finally, the third constraint specifies that either B is set to true or C is set to false.

One of the solutions to this problem is the assignment of false to A, true to B, and true to C. Every constraint is satisfied by this assignment.

The problem of solving CNF problems is one of the central problems in computer science, because many other decision and optimization problems can be translated into this form. Cook (1971) proved that any problem that can be solved by a non-deterministic Turing machine in polynomial time (that is, any problem in the class NP) can be reduced to a CNF problem (S. A. Cook, "The Complexity of Theorem-Proving Procedures", in *Proceedings of the 3rd Annual ACM Symposium on the Theory of Computing*, pp. 151–158, 1971). A catalogue of such problems from many areas of computer science appears in M. R. Carey and D. S. Johnson, *Computers and Intractability*, 1979, including integer programming, the travelling salesman problem, graph coloring, and many others.

An efficient way of solving CNF problems would immediately yield an efficient way of solving all the different kinds of problems in NP. It is believed that no efficient procedure exists for solving all instances of CNF problems. However, it is possible and useful to devise procedures that efficiently solve many, if not all, instances of CNF problems. The invention pertains to such a method.

One way of solving constraint satisfaction problems is by performing a systematic search of all possible assignments of values to variables. This is the basis of the Davis-Putnam algorithm (M. Davis and H. Putnam, "A computing procedure for quantification theory", *Journal of the Association for Computing Machinery*, vol. 7, 1960, pp. 201–215, 1960) which is the most widely-used procedure.

An alternative approach is based on greedy local search, which is also referred to as heuristic repair (see D. S. Johnson, C. H. Papadimmitrou, and M. Yannakakis, "How easy is local search?", *Journal of Computer and System Sciences*, vol. 37, pp. 79–100, 1988). The idea of this approach is to start with some initial assignment of values to variables, which may be generated randomly or by some other method. The initial assignment will in general violate one or more constraints. The algorithm then tries to reduce the total number of violated constraints by changing the value assigned to one of the variables. Such changes are made until all constraints are satisfied, or the algorithm reaches some pre-set maximum number of changes. If an assignment is not found, one can repeat this procedure, starting at a different initial assignment. This method has been successfully applied to CNF problems, as described in B. Selman, H. Levesque, an D. Mitchell, "A New Method for Solving Hard Satisfiability Problems", in *Proceedings of the Tenth National Conference on Artificial Intelligence*, pp. 440–446, 1992, and in J. Gu, "Efficient local search for very large-scale satisfiability problems", in Sigart Bulletin, vol. 3, no. 1, pp. 8–12, 1992.

The standard greedy local search algorithm considers all constraints to be of equal importance when deciding which variable to modify. This can cause the procedure to be unable to solve problems where some constraints are very hard to satisfy. The phenomenon in which a greedy local search procedure reaches a state in which it cannot proceed to satisfy the remaining violated constraints is called a local minima. One proposal for escaping from such local minima is the method of simulated annealing (S. Kirkpatrick, C. D. Gelett, and M. P. Vecchi, "Optimization by simulated annealing", *Science*, vol. 220, pp. 621–630, 1983), which introduces random modifications of the assignment. The invention described here is an alternative strategy for alleviating the problem of local minima, and thus extends the range of applicability of the greedy local search method.

SUMMARY OF THE INVENTION

The problem of local miniran in solving constraint satisfaction problems is alleviated by associating a weight with each constraint, using these weights in the computation of which variable to modify while searching, and updating the weights dynamically each time a local minimum is reached.

The foregoing and other aspects and advantages of the techniques disclosed herein will be apparent to those of ordinary skill in the art upon perusing the following Drawing and Detailed Description, wherein:

BRIEF DESCRIPTION OF THE DRAWING

FIG. 1 is pseudo-code for a prior-art greedy local search technique;

FIG. 2 is an example asymmetrical graph;

FIG. 3 is a first method employed in the greedy local search technique of the invention;

FIG. 4 is a second method employed in the greedy local search technique of the invention;

FIG. 5 is a table comparing the results of using the prior-art greedy local search technique and the greedy local search technique of the invention;

FIG. 6 is a graph showing how the greedy local search technique of the invention eliminates local minima;

Figure 7:
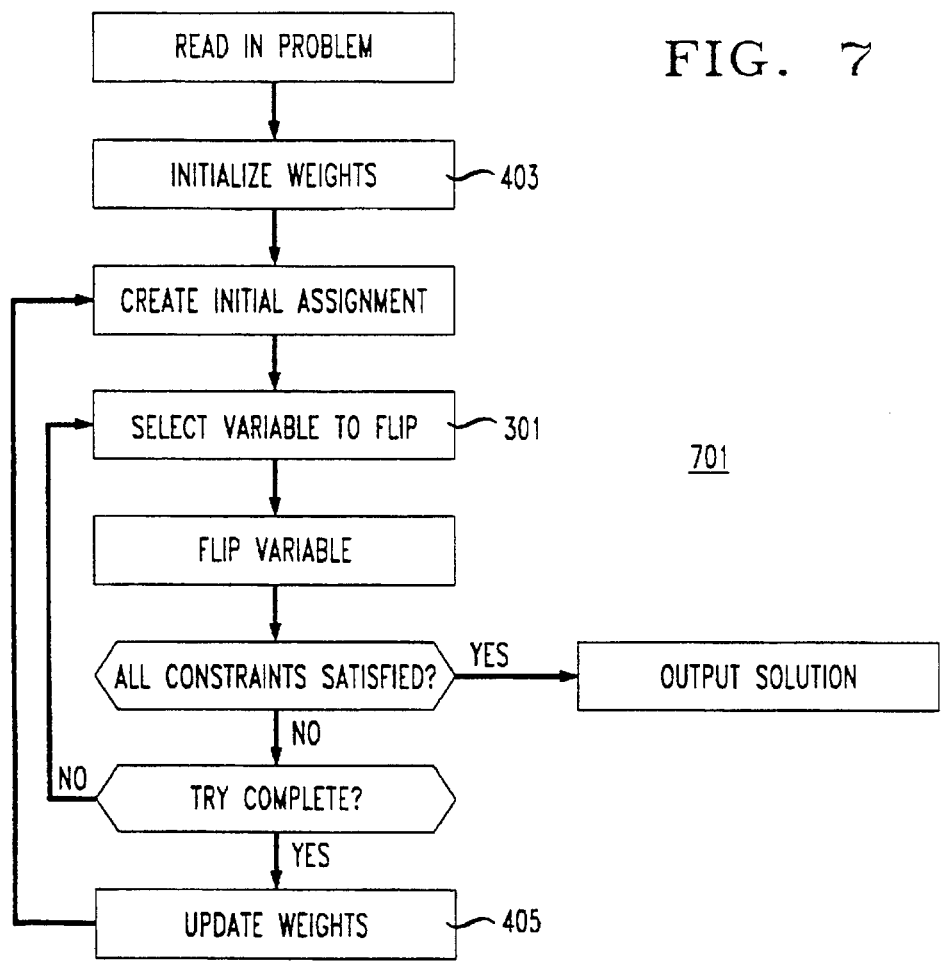
FIG. 7 is a flowchart of the greedy local search technique of the invention.

Reference numbers in the Detailed Description have two parts: the right-most two digits are element numbers within a figure and the remaining digits indicate the figure in which the element first appears. Thus, element 503 first appears in FIG. 5.

DETAILED DESCRIPTION

The following Detailed Description first describes the prior-art GSAT procedure, then gives an example of a constraint problem which the GSAT procedure is incapable of solving, and thereupon describes an improved version of the GSAT procedure which can solve such problems.

The GSAT Procedure: FIG. 1

FIG. 1 shows a prior-art procedure 101 called GSAT, which solves CNF constraint satisfaction problems by performing greedy local search (B. Selman et al., supra, 1992). In CNF constraint satisfaction problems, constraints are called clauses, and are disjunctions of literals. A literal is a propositional variable or its negation. A set of clauses corresponds to a formula in conjunctive normal form (CNF): a conjunction of disjunctions. For example, in the previously-introduced constraints "A or C", "(not A) or C", and "B or (not C)", A, B, and C are literals, "A or C" is a disjunction of literals, and the constraint can be expressed as the clause (A or C) and ((not A) or C) and (B or (not C))

which is a conjunction of the disjunctions.

Procedure 101 starts with a truth assignment 103. It then changes (flips) (110) the assignment of the variable that leads to the largest increase in the total number of satisfied clauses 108. Such flips are repeated (loop 105) until either a satisfying assignment is found (112) or a pre-set maximum number of flips (MAX-FLIPS 111) is reached. This process is repeated (loop 107) as needed, up to a maximum of MAX-TRIES times. A try is one execution of outer loop 107 of GSAT procedure 101.

GSAT 101 mimics the standard local search procedures used for finding approximate solutions to optimization problems (C. H. Papadimitriou and K. Steiglitz, *Combinatorial optimization*, 1982) in that it only explores potential solutions that are "close" to the one currently being considered. Specifically, it explores the set of assignments that differ from the current one on only one variable (108, 110). One distinguishing feature of GSAT 101, however, is the it also allows flips that do not directly improve the assignment; i.e., when the best possible flip does not actually decrease the total number of satisfied clauses. As discussed in (B. Selman et al., supra, 1992), such flips are essential in solving hard problems. Another feature of GSAT 101 is that the variable whose assignment is to be changed is chosen at random from those that would give an equally good improvement. Such non-determinism makes it very unlikely that the algorithm will make the same sequence of changes over and over.

The GSAT procedure 101 requires the setting of two parameters, MAX-FLIPS 111 and MAX-TRIES 109, which determine, respectively, how many flips the procedure will attempt before giving up and restarting, and how many times this search can be restarted before quitting. As a rough guideline, setting MAX-FLIPS equal to a few times the number of variables is sufficient. The setting of MAX-TRIES will generally be determined by the total amount of time that one wants to spend looking for an assignment, which in turn depends on the application. In our experience so far, there is generally a good setting of the parameters that can be used for all instances of an application. Thus, one can fine-tune the procedure for an application by experimenting with various parameter settings.

Using Weights

On certain problems GSAT 101 will fail to find a solution, because at the end of almost every try the same set of clauses remained unsatisfied. This failure can occur when the problems contained strong asymmetries, which generate local minima in the search space. The effect of asymmetry is best illustrated with the graph 201 shown in FIG. 2.

Consider trying to color graph 201 with three colors, using GSAT 101. Initially each node is randomly assigned one of the three colors. The procedure then starts adjusting colors in order to minimize the number of conflicts. (A conflict occurs when two connected vertices have the same color.) Since the constraints between the large group of nodes 203 and the single nodes 205 at the bottom far outnumber the single constraint between the two bottom nodes, the algorithm quickly gets stuck in a state where the bottom two nodes 205 have the same color and each node in the larger set has one of the other two colors. This coloring satisfies all but one constraint. In other words, the single constraint between the bottom two nodes is out-voted by the other nodes.

To overcome asymmetries, the invention associates a weight with each constraint. A weight is a number, indicating how often the clause should be counted when determining which variable to flip next. Stated more precisely, having a clause with weight L is equivalent to having the clause occur L times in the formula.

FIG. 3 presents a procedure 301 which may be used in part 108 of algorithm 101. The procedure takes the weights into account in selecting which variable to flip. The procedure requires the data structures declared at 303; nvars is the number of variables in the clauses; nclauses is the number of clauses in the constraint. The main part of procedure 303 is loop 305 which determines a score based on the weights for each variable in turn. The first step is to set the score for the current variable to 0; then it flips the value assigned to the variable (307). Next, loop 309 is executed for the current variable. In the loop, each of the clauses is checked to determine if it is satisfied by the values currently assigned to the variables in assign; if the clause is satisfied, the score of the current variable is increased by the weight for the clause (308). After loop 309 is finished, the current variable is reset to its previous value (311). After loop 305 is finished, score is examined to determine the variable whose entry in the array has the highest value (313). That variable is then the one whose truth assignment is reversed in step 110 of procedure 101.

The weights in weights are dynamically adjusted using the procedure 401 shown in FIG. 4. Prior to the beginning of loop 107 of procedure 101, the weights for all of the clauses are initialized to 1 (403). Then at the end of loop 105, the weight of each clause which is not satisfied by the values currently assigned to the variables in assign is incremented by 1. As a result, clauses which are not easily satisfied by the values assigned to the variables by the flipping process of procedure 101 have ever increasing influence on which variable is selected to have its value changed. In procedure 401, the weights are updated by being incremented by 1, but other update methods could be implemented instead. For example, weights could be incremented by a number other than 1, or could be multiplied by some factor, etc.

FIG. 7 is a flow chart for GSAT procedure 701 employing weights. In that procedure, the steps of procedure for dynamically updating weights 401 are indicated by the reference numbers 403 and 405, while reference number 301 indicates the use of that procedure to select the variable to flip. .P The strategy of GSAT procedure 701 automatically "discovers" hidden asymmetries of the formula under consideration. The advantages of GSAT 701 are shown in FIG. 5. Table 501 shows the distribution of the number of unsatisfied clauses after each try for basic GSAT 101 (without procedures 301 and 401) and weighted GSAT 701 (with procedures 301 and 401). The problem to which basic GSAT 101 and weighted GSAT 701 was applied was a 50 node graph coloring problem. The set of constraints for the problem contained 200 variables and 2262 clauses. Both versions of GSAT were run with MAX-TRIES 109 and MAX-FLIPS 111 set to 1000. In table 501, column 503 shows the number of unsatisfied clauses at the end of a try; column 505 shows the number of times basic GSAT 101 reached that number of unsatisfied clauses in the 1,000 tries; column 507 shows the number of times weighted GSAT 701 reached that number in the 1,000 tries. As shown in the first row of column 501, none of the 1,000 tries performed by basic GSAT 101 resulted in an assignment of values to the variables which satisfied all of the clauses; 80 of the 1,000 tries performed by weighted GSAT 701 found such an assignment of values. Similarly, basic GSAT 101 found an assignment with one unsatisfied clause only twice, while weighted GSAT 701 found such an assignment 213 times.

Using this weighing strategy, one can also easily solve the kinds of formulas discussed in section 4 of (B. Selman et al., supra, 1992). Those formulas were introduced to show some of the limitations of basic GSAT. They were handcrafted to repeatedly steer GSAT in the wrong direction. The weighing strategy again compensates quite easily.

FIG. 6 illustrates the effect of the weighing strategy on the search space for GSAT. (Note that GSAT searches for a global minimum in the number of unsatisfied clauses as a function of the truth assignments. FIG. 6 abstractly represents this function, with the number of unsatisfied clauses along the vertical axis and truth assignments along the horizontal axis.) As shown in curve 601, the function has a local minimum at 603. Basic GSAT 101 "gets stuck" in the local minimum and never reaches global minimum 605. The effect of procedures 301 and 401 is shown in curve 609: as shown by line 607, the weighting dynamically "fills in" local minimum 603 so that weighted GSAT 701 can reach global minimum 605. While the foregoing has demonstrated the effectiveness of weighting with basic GSAT 101, it should be pointed out that the technique may be used to avoid local minima in other optimization methods.

A More Efficient Implementation

Given its simplicity, the GSAT procedure is straightforward to implement. However, if care is not taken, the implementation can easily be too inefficient for solving problems of real interest. One of the computationally more expensive steps in the GSAT procedure is the selection of which variable to flip next. A simple implementation, as given in FIG. 3, considers each variable, and computes the total score of the assignment that would result from flipping the variable. From the variables that give the highest score, the procedure then randomly selects one, and modifies the current assignment by changing the truth assignment of that variable. After such a flip, one would have to consider again each variable to determine scores that would result from flipping it.

However, there is a much more efficient way of picking which variable to flip, which results in selecting the same variables, but with less computational effort. After generating the initial truth assignment, compute the score for that assignment. Then for each variable, compute the difference between the score of the initial assignment, and the score of the assignment produced by flipping that variable. Store those values in an array improve [1, . . . ,N] with an entry for each variable (numbered from 1 to N). The algorithm picks a variable k to flip whose value improve [k] is greatest; that is, one that would lead to the greatest improvement in the score.

After flipping variable k, the only values that can possibly change in the improve array are those of variables that share clauses with variable k. In addition, to compute the change in their improve values, the algorithm only needs to consider those clauses that actually contain k. So, instead of re-evaluating the improve values for each variable—which would mean looking at the whole formula—the algorithm incrementally update improve, by considering only those clauses that contain the recently flipped variable.

Areas of Applicability

The invention of using dynamically updated constraint weights can be used for any local search method for solving constraint satisfaction and optimization problems. Such problems arise in many fields of endeavor, including VLSI (Very Large Scale Integrated Circuit) design, scheduling, telephone network routing, computer vision, and robot path planning. The following discussion gives an example of its use in the latter area.

Robot Control Apparatus Embodying the Invention

A great amount of research in artificial intelligence has concentrated on the problem of synthesizing plans to control the motion of a robot arm; for example, see R. E. Fikes and N. J. Nilsson, "STRIPS: A new approach to the application of theorem proving to problem solving", *Artificial Intelligence*, vol. 2, pp. 189–208, 1971. A planning system is given as input a set of operators that describe the possible actions than can be carried out by the robot arm (such moving a block from a position on a table to the top of another block, etc.), a description of an initial state of the world (e.g. configuration of blocks on a table), and and description of a goal state. The system then synthesizes a sequence of operators, called a plan, whose execution by the robot arm would transform the initial state into the goal state.

Planning has been formalized both as logical inference (J. McCarthy and P. J. Hayes, "Some Philosophical Problems From the Standpoint of Artificial Intelligence", in *Machine Intelligence* 4, pp. 463–502, 1969), and as constraint satisfaction (Mark Stefik, "Planning with Constraints (Molgen: Part 1 and 2)", *Artificial Intelligence*, vol. 16, pp. 111–170, 1981). Recently, H. Kautz and B. Selman united these approaches in a system that performs planning by solving Boolean constraint satisfaction problems ("Planning as Satisfiability", in *Proceedings of the 10th European Conference on Artificial Intelligence*, pp. 359–363, 1992).

Figure 8:
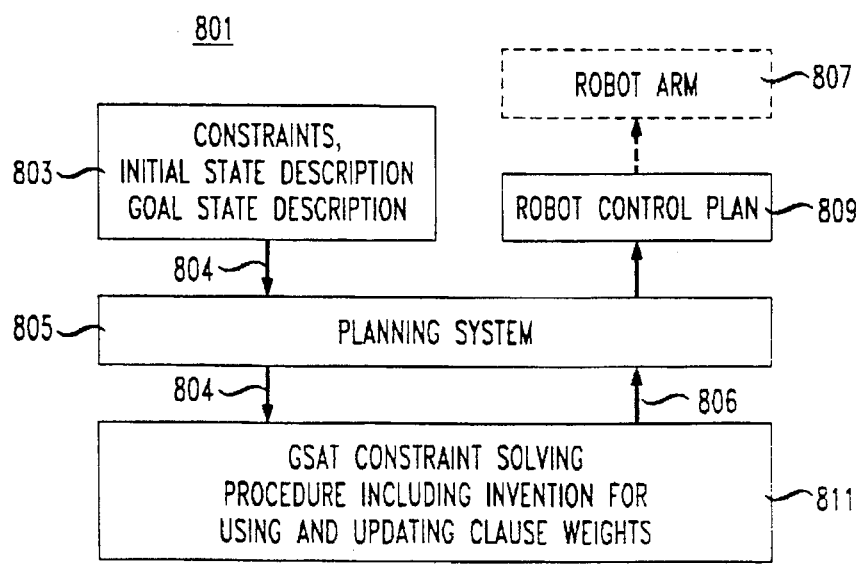
FIG. 8 is a block diagram of apparatus which employs the invention to control the motion of a robot arm.

FIG. 8 shows a robot arm control system 801 which employs a planning system 805 to make a robot control plan 809 which controls robot arm 807. The particular robot arm control system 801 shown here takes inputs 803 describing a set of constraints and an initial state description and a goal state description and employs weighted GSAT constraint procedure 811 to produce robot control plan 809 from the constraints, initial state description, and goal state description.

The constraints of inputs 803 are a set of Boolean formulas that describe the possible behaviors of the robot arm over a fixed period of discrete timesteps. Each propositional variable stands for either some fact about the world holding at some moment of time (e.g., variable X may stand for the fact that "block A is on the table at time 1", and variable Y may stand for the fact that "block A is being held by the robot gripper at time 2"), or that some action occurs at some time (e.g., variable Z may stand for the fact that "arm picks up block A at the end of time step 1"). The Boolean clauses describe the possible relationships between the variables. For example, the clause "(X and Z) implies Y" can be interpreted as follows: if it true that block A is on the table at time 1, and it is true that the arm picks up block A at the end of time step 1, then it must likewise be true that block A is held by the gripper at time 2.

The initial state and goal state are further described as sets of clauses. The complete set of clauses for the constraints and the initial and goal states appears as arrow 804. Planning system 805 then invokes weighted GSAT algorithm 811 to compute a truth assignment that satisfies the complete set of clauses. The truth assignment is returned to planning system 805 (arrow 806), which then synthesizes a plan 809 by selecting actions that correspond to action variables that are set to true in the assignment. Planning system 805 then outputs plan 809, and/or directly invokes the low-level control system of a robot arm 807 to carry out the actions of plan 809.

Conclusion

The foregoing Detailed Description has shown how the technique of dynamic weighting can be generally used in optimization to prevent the optimization procedure from "getting stuck" at local minima, how the technique can specifically be used in the GSAT greedy local search procedure to solve problems otherwise not solvable by the procedure, and how the technique is employed in apparatus for controlling a robot arm. In the preferred embodiment of the detailed description, the technique is used to solve CNF constraint satisfaction problems; it is, however, not limited to such constraint satisfaction problems, but may be used in any constraint satisfaction problem where local minima may cause the optimization procedure to fail to find the global minimum. Further, in the example aplication, the technique is applied to the control of a robot arm; however, the technique may be applied in any control system which must take constraints into account and in any such resource allocation system.

While the Detailed Description has described the best mode presently known to the inventors of practicing the invention, other implementations of the principles disclosed herein will be immediately apparent to those skilled in the art. For example, in other implementations, the first set of values assigned to the variables may not be chosen at random, but may be an approximation of a final value.

Because of the variety of areas in which the principles of the invention may be applied and the many ways in which the invention may be implemented, the foregoing Detailed Description is to be understood as being in every respect illustrative and exemplary, but not restrictive. The scope of the invention disclosed herein is therefore not to be determined from the Detailed Description, but rather from the attached claims, which are to be given the broadest interpretation to which they are entitled under the law.

What is claimed is:

1. An improved method of controlling a system whose operations on a physical entity are subject to constraints, the method including the steps of:

finding values of variables in the constraints such that the values satisfy the constraints; and controlling the system using the values such that the constraints are not violated in the operations, and the improvement comprising, in the step of finding values of variables, the steps of:

associating a weight with each constraint; and repeating the steps of using the weights to select at least one of the variables of the constraints whose value is to be altered to produce a current assignment of values to the variables, and dynamically updating the weight for each constraint according to whether the current assignment of values to the variables satisfies that constraint, the steps of using the weights and dynamically updating the weight being repeated until the current assignment of values to the variables satisfies all of the constraints.

2. The method set forth in claim 1 wherein:

the step of dynamically updating the weight includes the step of increasing the weight for each constraint which is not satisfied by the current assignment of values.

3. The method set forth in claim 2 further comprising the steps of:

computing a score for the current assignment of values to the variables which indicates the number of satisfied constraints; and for each variable, determining a difference by altering the value of the the variable and comparing the number of constraints satisfied after the alteration with the score; and wherein the step of using the weights to select at least one of the constraints includes the step of selecting the variable whose value is to be altered according to the differences.

4. The method set forth in claim 3 wherein:

the step of using the weights includes the step of determining a greatest difference; and the step of selecting the variable whose value is to be altered selects a variable with the greatest difference.

5. The method set forth in claim 3 wherein:

the step of determining the difference includes determining the difference using only those variables which share clauses with the variable whose value is to be altered.

6. The method set forth in claim 1 wherein:

the step of using the weights to select at least one of the variables includes the step of determining which of the constraints has a greatest weight.

7. The method set forth in claim 6 wherein:

the step of using the weights to select at least one of the variables includes the step of selecting a variable whose constraint has the greatest weight.

8. The method set forth in any of claims 1, 2, 3, 4, 5, 6, or 7 wherein:

the variables are binary variables; and the constraints are a formula in conjunctive normal form.

9. Improved control apparatus for controlling a system whose operations on a physical entity are subject to constraints, the control apparatus including:

means for finding values of variables in the constraints such that the values satisfy the constraints; and means for controlling the system using values the such that the constraints are not violated in the operations;

the improvement comprising:

in the means for finding values of variables, means for associating a weight with each constraint; and means for dynamically updating the weight for each constraint according to whether a current assignment of values to the variables satisfies that constraint; and wherein the means for finding values of variables uses the weights to select at least one variable of the constraints whose value is to be altered to produce a new current assignment of values.

10. The control apparatus set forth in claim 2 wherein:

the means for dynamically updating the weight for each constraint includes means for increasing the weight for each constraint which is not satisfied by the current assignment of values.

11. The control apparatus set forth in claim 10 wherein the means for finding values of variables further comprises:

means responsive to the updated weights for determining which of the constraints has the greatest weight; and wherein the means for finding values of variables selects the constraint with the greatest weight.

12. The control apparatus set forth in any of claims 2, 10, or 11 wherein:

the variables are binary variables; and the constraints are a formula in conjunctive normal form.

* * * * *